United States Patent
Waldeck

[19]

[11] Patent Number: 5,934,739

[45] Date of Patent: Aug. 10, 1999

[54] VEHICLE, IN PARTICULAR ROAD OR RAILWAY VEHICLE WITH A SKELETON FRAME

[75] Inventor: Klaus-Dieter Waldeck, Geroldswil, Switzerland

[73] Assignee: Alusuisse Technology & Management Ltd., Switzerland

[21] Appl. No.: 08/746,947

[22] Filed: Nov. 18, 1996

[30] Foreign Application Priority Data

Dec. 7, 1995 [DE] Germany .......................... 195 45 591

[51] Int. Cl.⁶ .................................................. B62D 27/02
[52] U.S. Cl. ........................ 296/178; 296/205; 296/208; 296/210
[58] Field of Search ............................ 296/29, 178, 193, 296/203.01, 205, 208, 210

[56] References Cited

U.S. PATENT DOCUMENTS

| | | | |
|---|---|---|---|
| 2,502,320 | 3/1950 | Guernsey | 296/178 |
| 3,186,755 | 6/1965 | Ward | 296/178 |
| 3,673,675 | 7/1972 | Eggert, Jr. | |
| 3,827,137 | 8/1974 | Schubach | |
| 3,989,119 | 11/1976 | Cady | |
| 4,425,001 | 1/1984 | Mauri | 296/178 |
| 4,773,701 | 9/1988 | Messori | 296/29 X |
| 5,287,813 | 2/1994 | Hanni et al. | 296/29 X |

FOREIGN PATENT DOCUMENTS

| | | |
|---|---|---|
| 0013940 | 5/1983 | European Pat. Off. . |
| 0628469 | 12/1994 | European Pat. Off. . |

*Primary Examiner*—Joseph D. Pape
*Attorney, Agent, or Firm*—Bachman & LaPointe, P.C.

[57] ABSTRACT

A vehicle, in particular road or railway vehicle such as tour bus or the like having a skeleton frame comprising side-wall parts containing vertical sections and joining these panel-like floor and roof elements, a roof beam being provided on both sides of the roof element—is such that the structural roof beam is in the form of channel section that is open downwards, and, forming a roof space which opens on the upwards facing side, is fitted to the downwards facing end of the inner flange of the roof beam. Further, both roof beam flanges are joined by transverse rods or plates which are spaced apart from each other and are attached at one end to the downward facing end of the inner roof beam. Vertical sections or columns of the side-wall part are situated opposite holding rails which are attached to the inner channel flange of the roof beam.

20 Claims, 4 Drawing Sheets

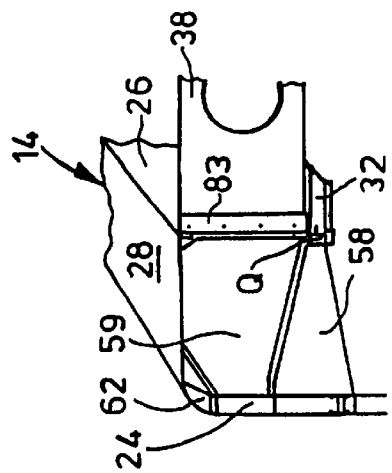
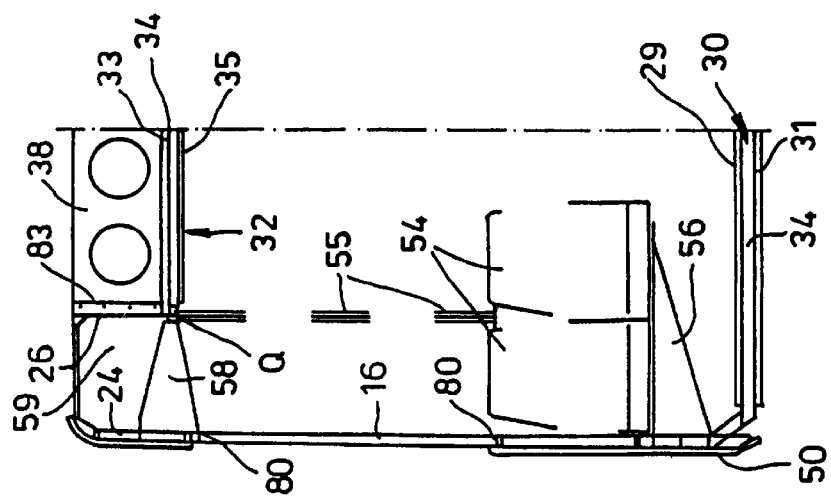
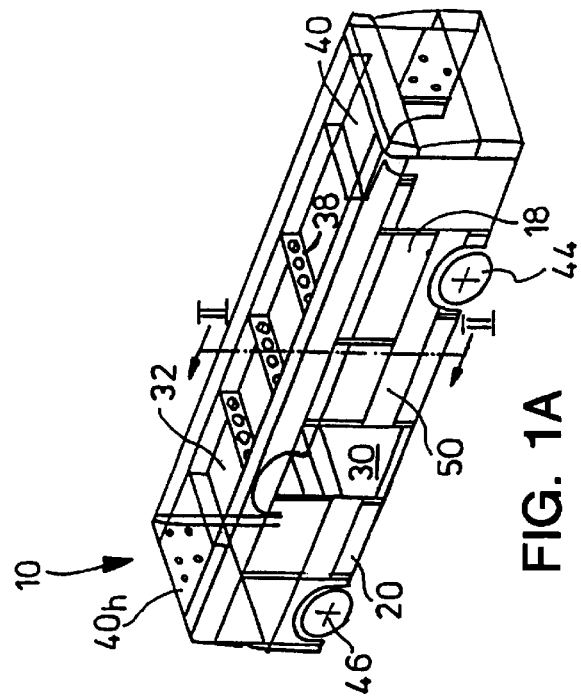

VEHICLE, IN PARTICULAR ROAD OR RAILWAY VEHICLE WITH A SKELETON FRAME

BACKGROUND OF THE INVENTION

The invention relates to a vehicle, in particular road or railway vehicles such as tour buses or the like having a skeleton frame comprising side-wall parts containing vertical sections and joining these panel-like floor and roof elements, whereby a roof beam is provided on both sides of the roof element, Vehicle superstructures with a structural frame of conventional design feature flush outer contours onto which cladding elements and window glazing are mounted. The roofing is insulated after the cover sheeting has been installed, and is covered over from below by panels. Cables, air ducts and components such as route indicator, mechanisms for operating the the doors and ventilation are installed at the sides in the roof which is then covered with a cladding that can be removed for maintenance purposes.

In modern low floor buses, in addition to the above mentioned fittings, equipment such as air containers or conduits, which was previously situated in the undercarriage, has to be accommodated in the roof. The resultant problems of space and noises caused by air can be solved or eliminated only at considerable expense or effort.

The European patent EP-O 628 469 A1 by the applicant describes a vehicle frame for road vehicles such as commercial vehicles or buses fitted with axles, engine, gears and further power train components. A structural frame is mounted on the undercarriage frame and then built out to form a space for carrying passengers or freight. The side-wall part of the structural frame exhibits vertical columns and, joining these, horizontal hollow sections acting as a support frame for cladding panels. The base element is a multi-layer base panel which is held by brackets both at the edges of the base panel itself and at these side-wall columns.

The previously known structural frame features continuous roof sections or beams at both sides, between which there is a roof element, which if desired contains an inner roof part below the outer roof cladding. The inner roof part may feature roof brackets and an inner roof panel which is displaced sideways with respect to the side-wall columns and is connected to the side-wall columns by means of brackets on the side-wall columns.

According to FR-PS 2 635 064 honeycomb-like floors, intermediate floors and ceilings, along with hollow sections that are welded together and run the fill length of the vehicle, are all assembled into railway vehicle structures. Replacing damaged parts could, if at all possible, be done only by cutting out lengths and welding in replacement parts.

SUMMARY OF THE INVENTION

In view of this state-of-the-art technology the object of the present invention is to simplify further the production of the vehicles mentioned above and, in particular, to propose a modular type of structure which allows prefabricated elements to be assembled into vehicles of different dimensions at the same time also allowing easy replacement of individual elements. That objective is achieved by way of the invention.

In accordance with the invention the roof beam is in the form of an open channel-type section that is open downwards and the roof element or roof panel, forming a roof space which opens on the upward facing side, is fitted to the downward facing end of the inner channel flange of the roof beam. This way the vehicle is provided with an inner roof structure and roof space which that will accommodate gas bottles, pressurized air containers or the like accessories when the vehicle is in use.

According to a further feature of the invention the vertical sections or channel flanges of the load-bearing roof beam should be joined by transverse rods or support plates which are spaced apart and are attached at one end to the downward facing end of the inner lying channel flange and at the other end to vertical sections or side-wall columns. The latter are advantageously situated facing the holding rails which are attached to the inner channel flange of the roof beam, and along with the downward facing end of the inner channel flange and a support plate define a joining area.

The side-wall part or side-wall module preferably features at least one channel for passage of air and/or cables in the region of the roof beam. At least one channel for air supply and/or a channel for cables are defined by the support plates of the roof beam; if these are in the shape of a V in the lying position, their flanges define the bottoms of the channels which are delimited by horizontal connecting plates.

In order to provide additional stability, the channel inner flanges of the roof beams of two parallel side-wall parts are joined by transverse elements above the roof panel e.g. by struts featuring openings in them. The roof panel and the transverse elements may also be covered over by a protective cover of light weight material which keeps out moisture and dirt.

It has been found favorable for the channel flanges of both roof beams to be made out of extruded sections featuring undercut push-fit grooves with opening slits that serve as connecting elements. Approximately the lower end of the inner channel flange is therefore provided with a groove with an opening that faces downwards and into which the seat supporting rods can be secured. A horizontal flange providing support for the roof panel projects out from the lower end of the inner channel flange.

According to another feature of the invention the upper end of the beam flange is formed by part of a hollow section, and the hollow section parts of both channel flanges are extended to form a channel-shaped self-supporting roof beam by a roof section running parallel to and a distance from the roof panel.

In the lower region of the side-wall part is a narrow, likewise extruded, hollow section serving as a base beam which is inclined, in the downwards direction, inwards at an angle towards the longitudinal axis of the vehicle.

According to the invention both the side-wall columns (16) and the floor panel (30) are joined to the base beam, the latter preferably by means of a cold joint.

Altogether the result is a vehicle which is made up of modules and is variable both in length and in width and features a circumventing base beam as crash zone at a height conforming to standards and exhibiting the following already mentioned advantages:

in the finished condition, as a result of the lower lying roof panel which is flush with the lower edge of the roof beam, an inner roof structure can be obtained with space above it for gas bottles, air containers or the like;

the load-bearing transverse structure, i.e. the so called support plate, above the roof panel provides considerably more stiffness in the transverse direction than normal roof supports; they can be employed for attaching fittings;

the U-shaped, load-bearing roof beam, which is open downwards, also serves as an air duct and space for equipment that requires maintenance and as a channel for cables; and is accessible from below;

the roof panel of composite material is a ready-to-install unit of high integral stability with integral roof insulation;

the roof beam, undercut by the vertical sections or sidewall columns, possesses a high degree of transverse stiffness for roll-over requirements;

the holding rails which extend the inner channel flange of the roof beam downward and are attached to the roof beam fulfill a definite static function; stabilizing inserts in the roof panel may be dispensed with;

the roof may be easily covered with a light, removable, dirt repellent means, and itself need not be waterproof; in the case of trolley-buses the dirt-repellent means may be made of insulating material.

BRIEF DESCRIPTION OF THE DRAWINGS

Further advantages, features and details of the invention are revealed in the following description of preferred exemplified embodiments and with the aid of the drawings showing in FIG. 1: a perspective expanded view of a bus assembled from modular parts; in order to provide a better overview the individual parts are shown separate from the bus;

FIG. 2: an enlarged view of a partial section of the bus along the line II—II in FIG. 1a;

FIG. 3: a further partial section through the bus as in FIG. 2;

FIG. 4: an enlarged detail of FIG. 3 shown in perspective view;

DETAILED DESCRIPTION OF PREFERRED EMBODIMENTS

Figure 1:
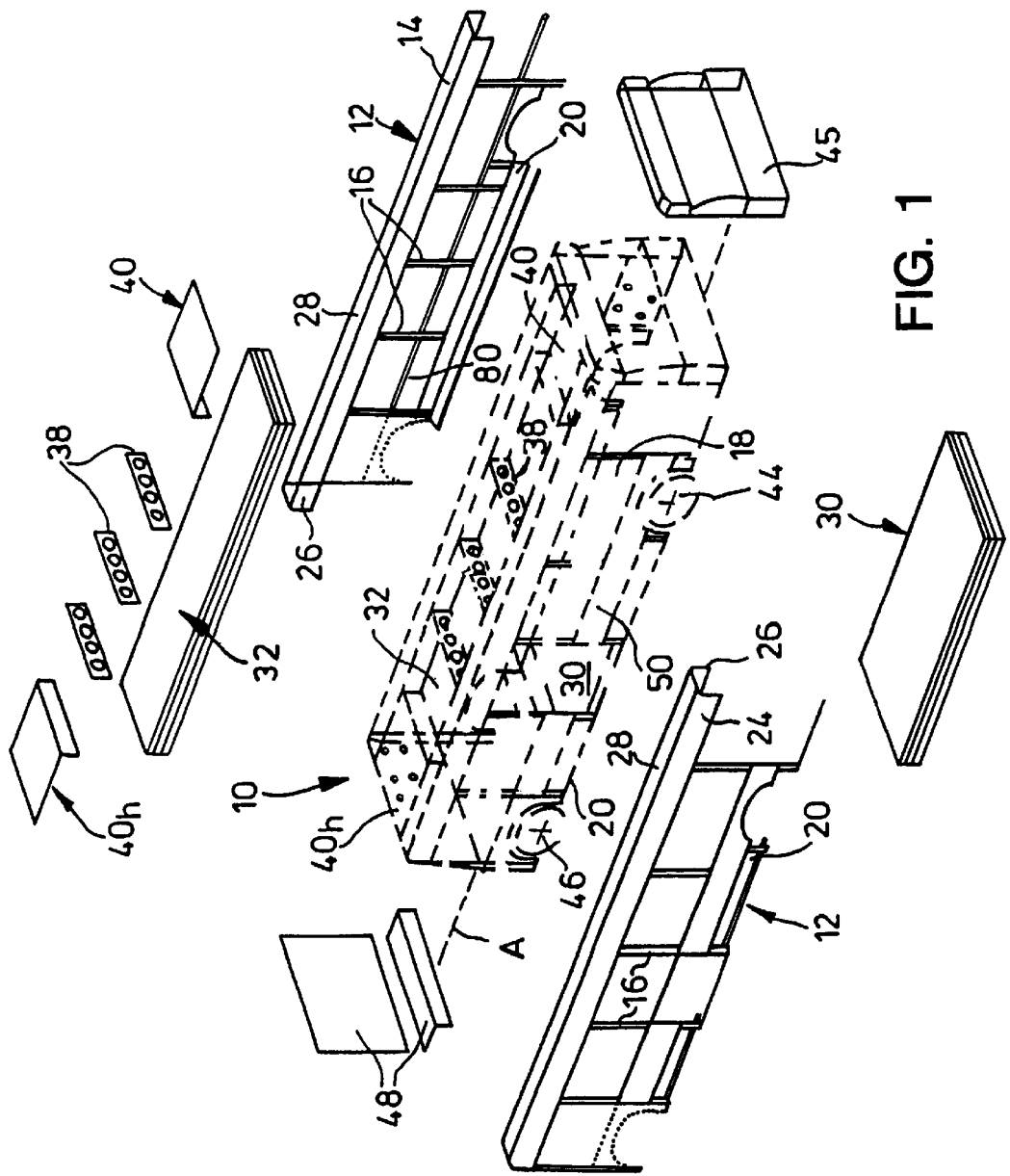
FIG. 1a: a perspective view of the assembled bus.

A bus 10 as shown in FIG. 1 features, on both sides of its longitudinal axis A, a side-wall module or parts 12 of a structural, load-bearing roof strut 14 in the form of an open channel-type roof beam 14 that is open downwards; side-wall columns 16 that run down from the roof beam and feature large side panes 18 between them, and a base beam 20. In the assembled state, a distance a of e.g. 260 mm from the ground B, is the lower edge 22 of a downwards pointing strut on base beam 20. The base beam 20, here of height e as shown in FIG. 7e, approximately 460 mm, is situated therefore in a region defined by ECE-guidelines (ECE/R 42 or ECE/R 93) which corresponds to the normal height of bumpers on private cars or the lower front protection area on commercial vehicles.

Figure 6:
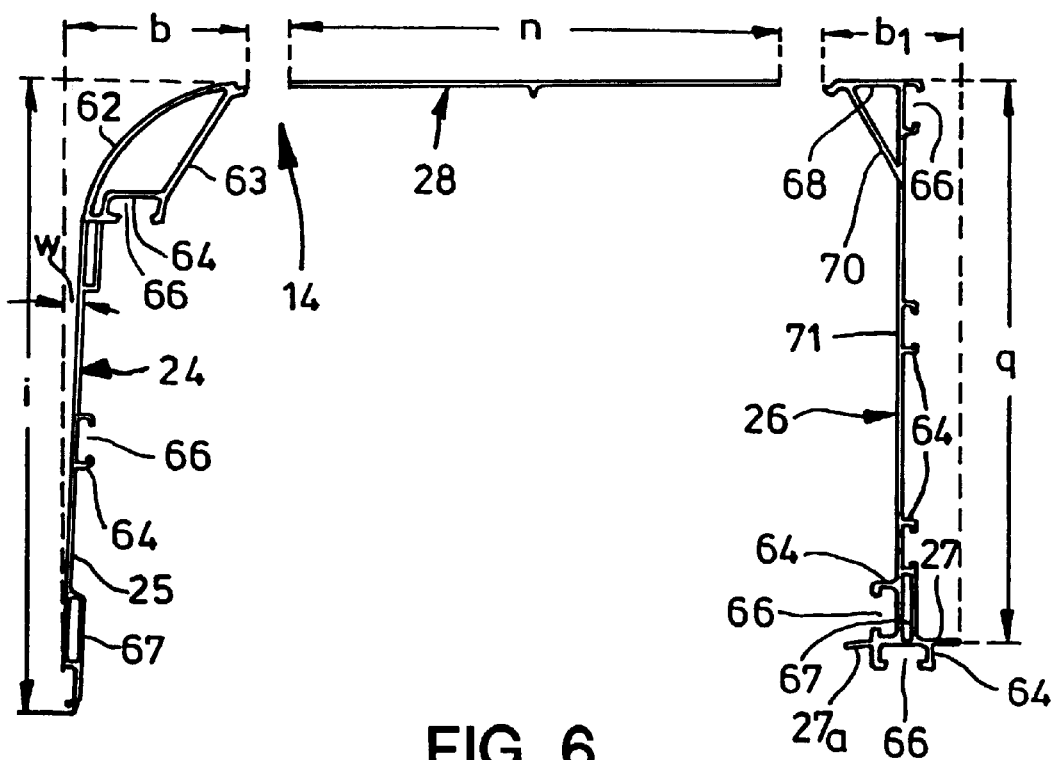
FIG. 6: three individual sections arranged with respect to each other as assembled and enlarged with respect to FIG. 3.

The total height h, here about 2570 mm, of the side-wall module 12 comprises an inner base height $h_1$ of 1120 mm, a window height $h_2$ and the height i of a roof beam, here approximately 430 mm. The breadth of the cross-section of the channel-like section or roof beam 14 comprises, as shown in FIG. 6, the outer dimension b of e.g. 120 mm of an, as viewed in the assembled state, outer channel flange or outer lying vertical section 24, the breadth $b_1$ of an inner channel flange or inner lying vertical section 26 and the length n of a roof section 28 which forms a part of the roof and joins the above mentioned vertical components.

Figure 2:
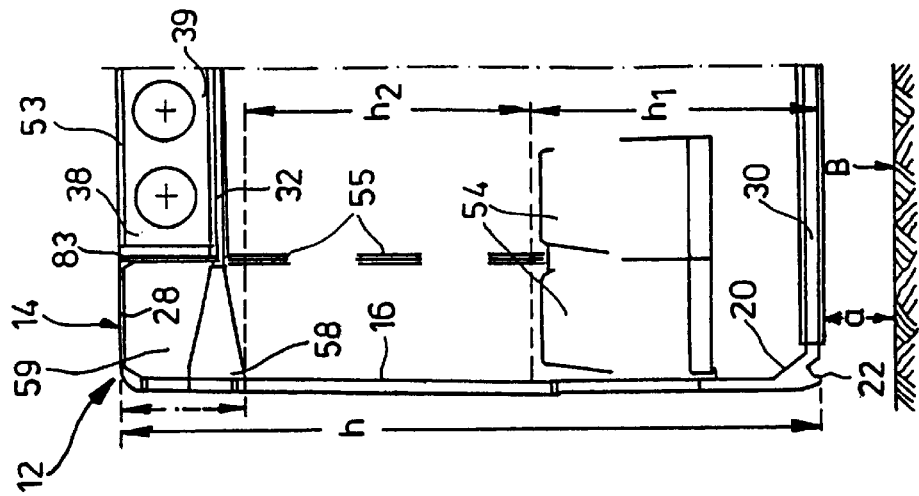

The two parallel side-wall modules 12 are joined in the region of the base beams 20 by a multi-layered composite panel in the form of a base or floor panel 30 shown in FIG. 2 and at the roof beams 14 by a likewise multi-layered roof panel 32. The latter comprises a cover panel 33 which is sufficiently strong to be walked on, a layer insulation 34 and cladding 35 on the inside.

The roof panel 32 rests on a lower horizontal strut 27 on the inner channel flange 26, and is therefore at an average distance q of about 400 mm below the surface of that roof section 28. The roof panels 32 cross a plurality of transverse elements or perforated struts 38 running between the pairs of inner channel flanges 26. Both at the back and front ends are fiberglass reinforced plastic end panels 40, $40_h$, which, as viewed in longitudinal cross-section, are L-shaped.

Shown in FIG. 1 are a front axle 44, front cladding 45 and two-part rear cladding 48 near the rear axle 46. Front and rear cladding 45, 48 are complemented by outer flanking panels 50 in the region of the base and side covering of the upper struts e.g. in the form of the outer channel flanges 24. To cover the still open roof space 39, a cover 53 like a tarpaulin, flexible, if desired, may be provided stretched over the perforated struts 38 (FIG. 2).

The side-wall panels 50 may cover the base beams 20 or start from above them. Cantilever seats 54 mounted on seat rods or holding rails 55 or supporting brackets 56 can be recognized in the region of the side-wall panels, the brackets 56 are attached at one end to the base strut 20 and taper upwards towards the passenger space in order to allow freedom of floor space for cleaning purposes.

The side-wall columns 16 are, as in FIGS. 2 to 4, connected by transverse rods or fishplate-like support plates 58 to the neighboring inner channel flange 26. The support plates 58 are wing-shaped, as viewed in front elevation, and taper towards the area of joining Q defined by the inner channel flange 26 and the inner roof panel 32. If present, the rods or or holding rails 55 for supporting the cantilever seats 54 may also terminate at the joining area Q. An air duct 59 runs above these support plates 58.

Figure 5:
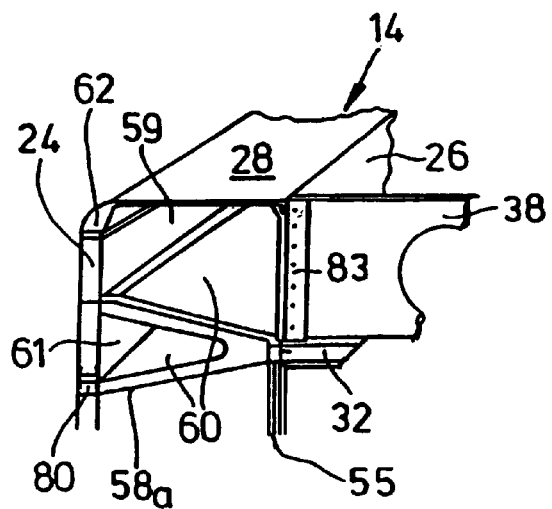
FIG. 5: another version of the detail shown in FIG. 4 detail.

In the design shown in FIG. 5 the support plates $58_a$ are in the form of a V-section lying on the side with horizontal connecting plates 60 joined to both flanges; the plates 60 delimit a conduit channel 61 which runs below the air duct 59 and is accessible from the passenger space.

As shown in FIG. 6, the lower region 25 of the, as installed, outer channel flange 24 is inclined slightly inwards at an angle w to the vertical, and is curved in the region close to the roof section 28. The resultant arched part 62 is formed by a chord-like wall 63 and extended to provide a length of hollow section by a push-fit section part 64. The push-fit section part 64 comprises a rectangular section with downwards facing opening 66 and undercut space.

The above hollow section of the outer channel flange 24 faces a corresponding hollow section of the inner channel flange 26; the latter is provided with a roof flange 68 pointing towards roof section 28 from which a forked strut 70 runs to the vertical length 71 of this inner channel flange 26.

On the outer, roof-facing side of the inner channel flange 26 are three of these push-fit section parts 64. Connecting to the lowest of these sections 64 is a length of stiffening rectangular section 67; such a section length can also be seen at the lower end of the outer channel flange 24. On the rectangular section length 67 of the inner channel flange 26 are two further push-fit section parts 64 which, viewed in cross-section are perpendicular to each other. A rib $27_a$ for the support plate 58, 58a projects out from the lowest push-fit section length 64 at the other side from the above mentioned horizontal strut 27 for the roof panel 32. This push-fit section part 64 is open on the downwards facing side and serves as a means of connection for the mentioned holding rail 55.

Figure 7:
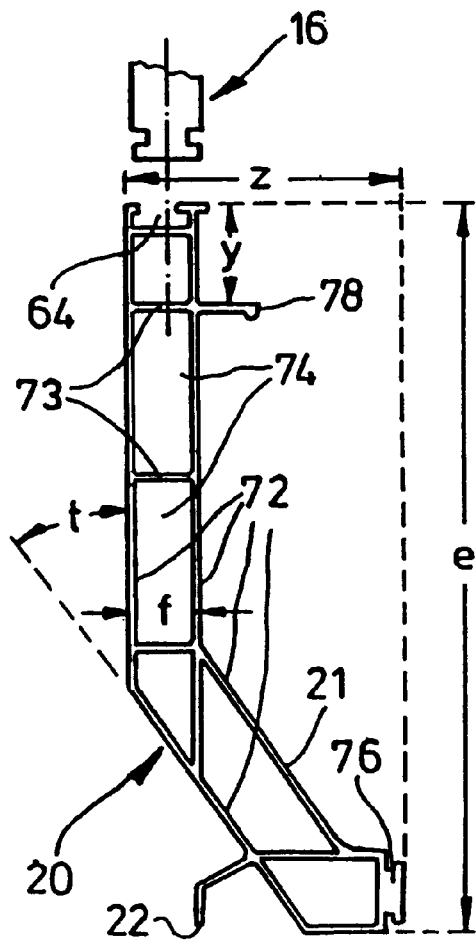
FIG. 7: an enlarged base beam section from FIG. 3.

The base beam 20 is, as shown in FIG. 7, a hollow section with two parallel outer walls 72 a distance f apart, which define compartments 74 by means of transverse struts 73. At the top of the base beam 20 is a push-fit section part 64 for connecting it to the side-wall columns 16; towards the bottom it is inclined inwards at an angle t; the resultant inwardly inclined part is indicated by the numeral 21. The undercutting end 76 for joining up to the bottom of the vehicle defines the width of the base beam 20 when installed, here about 180 mm. A supporting rib 78 which projects out on the inner side of the base beam 20 a distance y from the upward pointing push-fit section part 64 serves as a support for the above mentioned cantilever seats 54.

Figure 8:
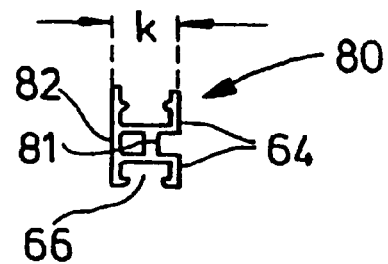
FIG. 8: a further section from FIG. 3.

Horizontal stiffening struts 80 run between the side-wall columns 16 in order to stabilize the structure. As shown in FIG. 8 this is a hollow section of width k of 40 mm comprising two push-fit section parts 64 running in opposite directions joined by a central rib 81 and an outer rib 82.

The side-wall module 12 is prefabricated complete with flanking panels 50 flanges 24 outer channel, side-wall glazing 18, interior cladding, not shown here, wiring, cables, channels for these and doors, seats 54 and holding rails 55; the width of choice which is defined by the floor panel 30 and roof panel 32 connected to the rest by cold joints i.e. without applying heat, determines the width of the resultant bus 10; the breadth of the side-wall module 12 is always the same. Also the roof assembly attached to perforated fish-plates on the roof beam 14 is pre-fitted with the necessary accessories such as compressed air tanks, LNG-bottles or the like, supply lines and openings.

The floor panel 30 is likewise a pre-fabricated construction with suitable surface 29 for walking on, layer 34 of insulation and corrosion resistant underseal 31.

I claim:

1. Vehicle, which comprises: a skeleton frame having side-wall parts containing vertical sections; a panel-like floor element and a roof panel joining the vertical sections; parallel roof beams provided on both sides of the roof panel, wherein the roof beams include inner channel flanges and outer channel flanges; and wherein the roof beams are in the form of an open channel-type section that is open downwards and wherein the roof panel and the inner channel flanges of both parallel roof beams form the boundary of a roof space which opens on the upward facing side and is fitted to the inner channel flanges of the roof beams; wherein the roof beams are load bearing structures, with the inner and outer channel flanges of each roof beam joined together by transverse rods or support plates which are spaced apart.

2. Vehicle according to claim 1, wherein each support plate is attached at one end to the downward facing ends of the inner channel flanges, and at the other end to outer channel flanges or side-wall columns of the side-wall parts.

3. Vehicle according to claim 1, including holding rails which are attached to the inner channel flange of the roof beam, and with said side-wall parts including side-wall columns, wherein the side-wall columns of the side-wall parts are situated opposite said holding rails.

4. Vehicle according to claim 3, wherein the holding rails along with the downward facing end of the inner channel flange and the support plates define a joining area.

5. Vehicle according to claim 1, wherein the open channel-type section delimits at least one channel for at least one of air ventilation purposes and cables.

6. Vehicle according to claim 5, wherein the support plates are in a form of a V-section and delimit a passage for a conduit channel and an air duct.

7. Vehicle according to claim 1, wherein the two roof beams run parallel to each other and wherein the inner channel flanges of the roof beams are joined above the roof element by transverse elements.

8. Vehicle according to claim 7, wherein the transverse elements including holes therein.

9. Vehicle according to claim 1, including a multi-layer panel as at least one of a roof panel and a base panel.

10. Vehicle according to claim 7, wherein the roof panel and the transverse elements are connected by a cold connection to the inner channel flanges by means of fish plates.

11. Vehicle according to claim 7, wherein the roof panel and the transverse elements are covered over by a moisture and dirt repellent cover made of light weight material.

12. Vehicle according to claim 1, wherein the channel flanges on each roof beam are each made of an extruded section featuring undercut push-fit channels having an opening therein.

13. Vehicle according to claim 1, wherein the lower of end each the inner channel flange is formed by a push-fit channel with an opening facing downwards.

14. Vehicle according to claim 1, including a horizontal strut serving as a supporting surface for the roof panel projects out from the lower end of the inner channel flange.

15. Vehicle according to claim 1, wherein the upper end of the inner and outer channel flanges are formed by a part of a hollow section, and the hollow section parts of said inner and outer channel flanges are extended by a roof section running parallel to and a distance from the roof panel.

16. Vehicle according to claim 1, wherein the lower region of the side-wall part is formed by a narrow hollow section serving as a base beam, the lower part of which is inclined inwards at an angle towards a longitudinal axis of the vehicle.

17. Vehicle according to claim 1, including a base beam, wherein the side-wall parts and the floor panel are joined to the base beam.

18. Vehicle according to claim 17, wherein said floor panel is joined to the base beam by a cold joint.

19. Vehicle according to claim 1, including two side-wall parts and floor and roof panels.

20. Vehicle according to claim 19, including front and back cladding parts, at least one of which is joined to the skeleton frame.

* * * * *